United States Patent [19]

Holzwarth

[11] 3,846,588

[45] Nov. 5, 1974

[54] TELECOMMUNICATION SYSTEMS

[75] Inventor: Herbert Holzwarth, Stockdorf, Germany

[73] Assignee: Siemens & Halske Aktiengesellschaft, Munich, Germany

[22] Filed: Nov. 16, 1970

[21] Appl. No.: 93,557

Related U.S. Application Data

[63] Continuation of Ser. No. 856,881, Aug. 29, 1969, abandoned, which is a continuation of Ser. No. 447,423, Aug. 5, 1965, abandoned.

[30] Foreign Application Priority Data

Aug. 7, 1964 Germany .............................. 92520

[52] U.S. Cl. .............................................. 179/15 FE

[51] Int. Cl. .............................................. H04j 1/00

[58] Field of Search .................................. 179/15 FE

[56] References Cited

UNITED STATES PATENTS 1,481,817 1/1924 Affel .............................. 179/15 FE

*Primary Examiner*—Ralph D. Blakeslee

[57] ABSTRACT

The present disclosure relates to message transmission systems particularly adapted for short distance telephony. In order that the expense of short distance telephone cables may be decreased, the cable line diameter is very greatly reduced, down to the minimum of about 0.2 mm. The attenuation suffered by the signals in the cable lines is compensated by a common amplifier stage to which the messages of a plurality of cable lines are supplied. At the amplifier stage, messages are mutliplexed together by a time or frequency multiplex converter, and after amplifying the messages are restored to their original time and frequency relationships by a second multiplex converter. The outputs of the second converter are connected to separate cable lines for further transmission of the deattenuated messages.

7 Claims, 9 Drawing Figures

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

TELECOMMUNICATION SYSTEMS

This application is a continuation of Ser. No. 856,881, filed Aug. 29, 1969, now abandoned, which is a continuation of Ser. No. 447,423, filed Aug. 5, 1965, now abandoned.

DESCRIPTION OF THE INVENTION

The invention relates to telecommunication system, of a type particularly suited for short-distance telephone work.

The total outlay on a telephone main subscriber station can be broken into the costs for local, regional and trunk traffic.

In recent years, the proportion of the cost attributable to trunk traffic has been reduced due to the introduction of single side band carrier frequency systems embracing large numbers of speech circuits and due to the transmission of the interlaced signals through coaxial lines or wireless channels. The proportion of the cost attributable to regional traffic has also been reduced by the introduction of simple carrier frequency units with single or double side band transmission. Pulse modulation systems have also recently come into use, and place less heavy demands upon the transmission properties of the lines.

However, efforts to effect multiplex working on local networks have had little success up to now, especially where local networks are of relatively small extent. For example, in the German Federal Republic, two thirds of all subscriber lines are less than 2 Km in length and the average length of trunks between local exchanges is only about 4 km. In the present state of the art, however, frequency-division multiplex or time-division multiplex equipments even of the simplest form can only economically be used over distances above between 10 and 15 km. For shorter distances, it is cheaper to use low frequency cables. It is for this reason that the proportion of the cost attributable to the local line network has risen to above 60 percent of the total cost associated with a main subscriber station.

One object of the invention is to adapt multiplex telecommunications techniques in a manner that is suitable in particular for short-distance telephone work.

The invention consists in a telecommunication system including a common repeater amplifier unit for use with a plurality of separate telecommunication lines, said unit comprising separate input connections and output connections for each one of said lines, first converter means for combining separate signals applied to said input connections to form a single multiplex signal, an amplifier for said single multiplex signal, and second converter means for reconstituting each of said separate signals in amplified form at its appropriate output connection.

In such a system individual signals may be transmitted at their original frequency through separate cables using copper conductors of the smallest possible diameter, for example about 0.2 mm; and de-atteuenuation of a plurality of such lines is effected by the insertion of common repeater amplifiers, each consisting of a common amplifier stage immediately preceded and followed by converters which interlace and reconstitute the individual signals in accordance with frequency-division or time-division multiplex processes.

A cable conductor diameter of about 0.2 mm represents the practical minimum feasible with current manufacturing and installation methods. Plastic material can be used for insulating the separate conductors, for example polyethylene. By way of comparison, the thinnest conductors which are at present in general use in cables for short-distance subscriber lines have a diameter of 0.4 mm for the same cable diameter. With 0.2 mm conductors it is possible to accommodate about three times the number of wires and the costs per pair of wires per kilometre are reduced by about 40 percent. The low line costs are achieved at the expense of higher attenuation; the attenuation figure being raised from 150 (mnp/km) to about 300 ($mnp_m$/km). When compared with a cable using 0.6 and 0.8 mm conductors, such as is customary for trunks between local exchanges, there is an even greater saving on the cost per wire pair per kilometre.

By use of the present invention, it is possible to raise the efficiency and make such a system more economical, so the invention provides for the common de-attenuation of several lines by multiplex amplifiers, in which converters operating on frequency-division or time-division multiplex principles are connected immediately before and after a common amplifier system, as opposed to normal multiplex techniques, in which the interlacing equipments are arranged at beginning and end of a length of wide band line so that the interlacing has to take account of the line properties. As this particular limitation disappears entirely, the converters can be of very simple construction.

In the case of interlacing using the frequency-division multiplex principle and where two-wire lines are used, amplifiers and converters are employed which have identical amplification and modulation properties, respectively, in both directions of transmission. For example, the common amplifier stage of an amplifier unit can be constituted by a two-wire amplifier with terminating sets or by an amplifier employing negative impedances. Preferably double side band amplitude modulation with carrier suppression will be employed, and in this context, not only push-pull modulation but double push-pull modulation with diodes is suitable. A particular advantage here is that there are no particularly high demands placed upon the accuracy of the carrier frequency since in each case two modulators allotted to the same channel are fed with the same carrier. Since the carrier frequency is arbitrarily selectable, by the use of a sufficiently wide carrier interval, for example 15 kc/s, only very simple filters are required. With four-wire lines, the arrangement is simplified to the extent that in each line a carrier frequency amplifier operating in only one direction of transmission is used; in this context too, the stability problems encountered with two-wire connections disappear.

With interlacing in accordance with the time-division multiplex principle, similar considerations are valid in respect of two-wire and four-wire connections to those applying in the case of frequency-division multiplex. Advantageously, in effecting the time-interlacing of the signals, parametrically operating amplifiers using resonance transmission principles will be employed.

The saving in cost per kilometre per wire pair, achieved by the use of extremely thin conductors, also makes possible a change from the use of conventional two-wire connections where the cable conductors are of 0.6 mm diameter and more, to the use of four-wire connections using very thin cable conductors and multiple amplifiers. In all cases, by exchanging conventional cables for cables using extremely thin conductors, the number of speech circuits can be substantially increased without the need for any more space and this is of particularly high importance in large towns where the costs of laying new underground cables are extremely high.

Systems of the type proposed in accordance with the invention are especially suited for use in local networks, and in particular for interexchange lines within such networks. A convenient figure for exploitation of the amplifiers is between 6 and 12 channels. The high d.c. resistance of the lines and the interlacing principle may not permit direct transmission of d.c. signals for dialing without resort to special measures. Therefore, it may be advantageous to employ code signals having frequencies selected within the transmitted band, as for example with multifrequency code dialling (e.g. in each case two out of five or six frequencies are transmitted). Alternatively, the signals required for exchange purposes can be transmitted through a special signal line which is common to several of the low frequency lines.

The invention will now be described with reference to the accompanying drawings, depicting several embodiments for effecting common de-attenuation of six lines, by way of example.

Figure 6:
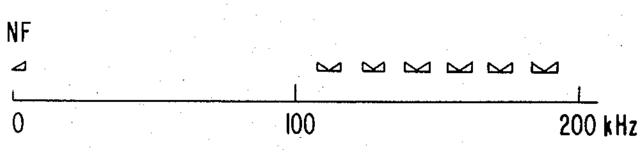
Figure 7:
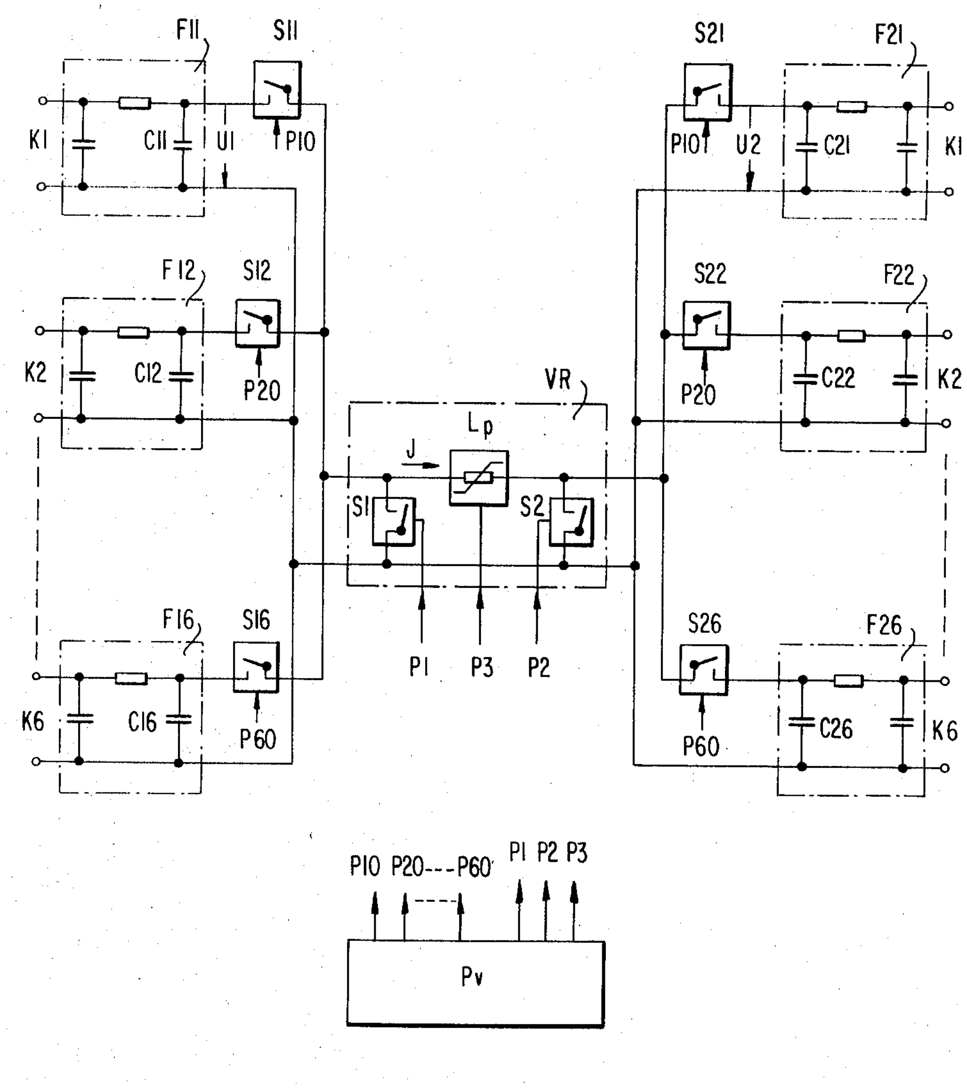
Figure 8:
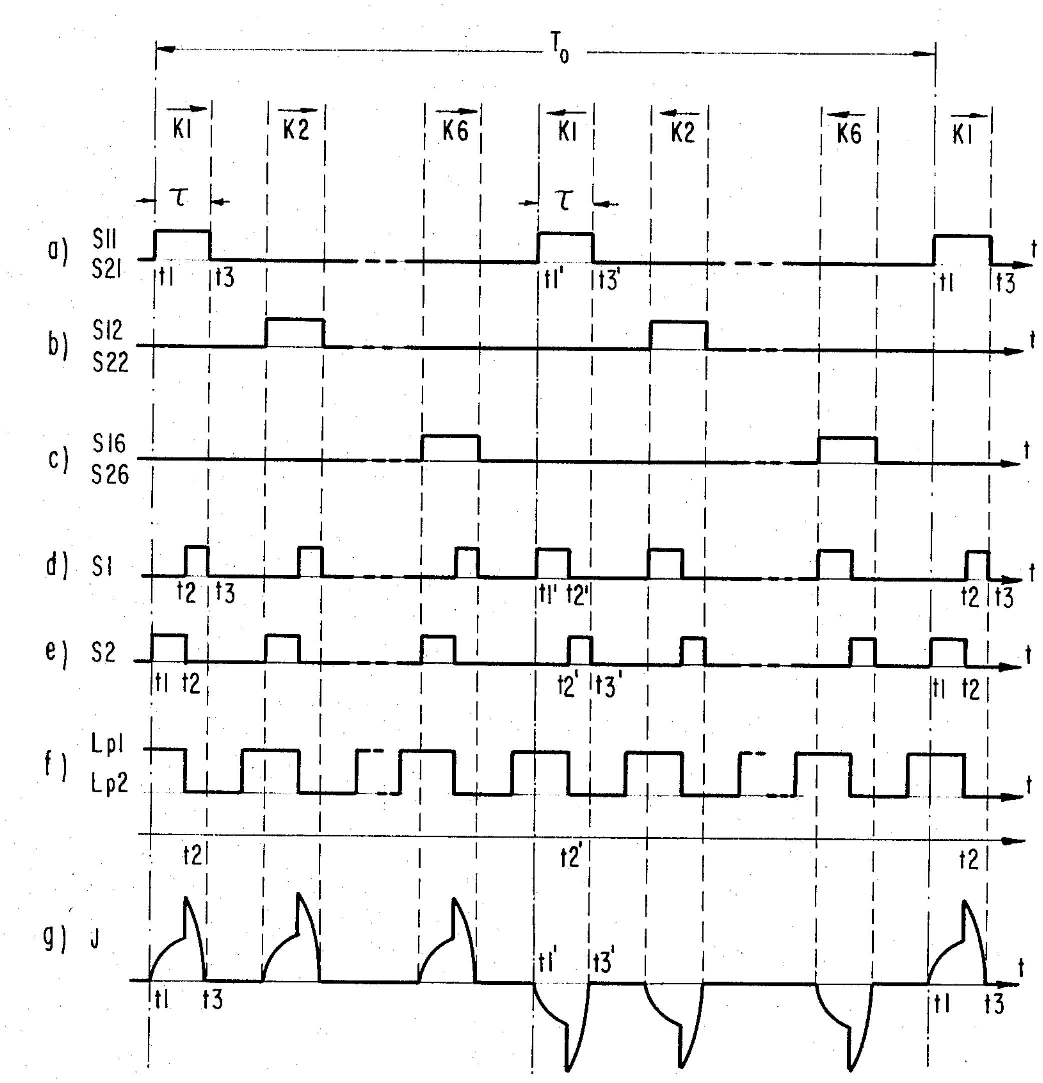
Figure 9:
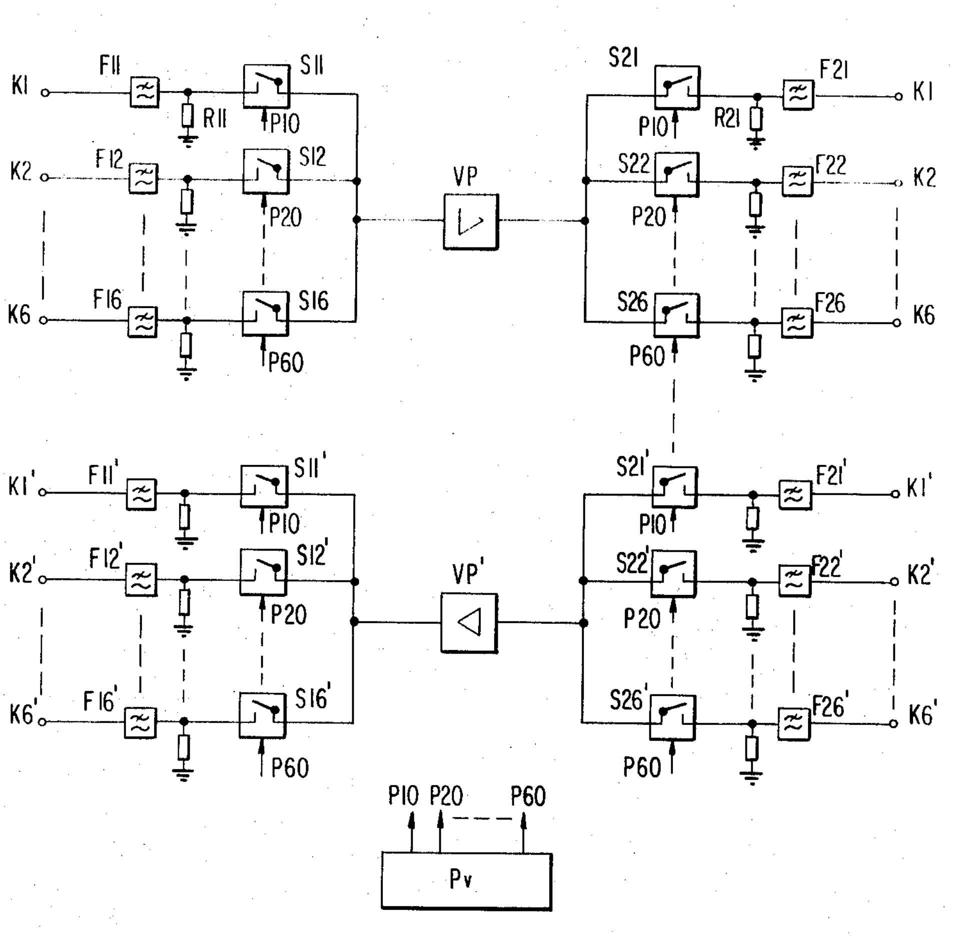

FIG. 6 graphically illustrates one suitable frequency schedule for a common amplifier unit using frequency-division interlacing;

FIG. 7 is a basic circuit diagram of a parametric common amplifier unit employing time-division interlacing, for two-wire connections;

FIG. 8 graphically illustrates the chronological sequence of operations in the common amplifier unit illustrated in FIG. 7;

FIG. 9 is a block schematic diagram of an alternative common amplifier unit employing time-division interlacing, for four-wire connections.

Figure 1:
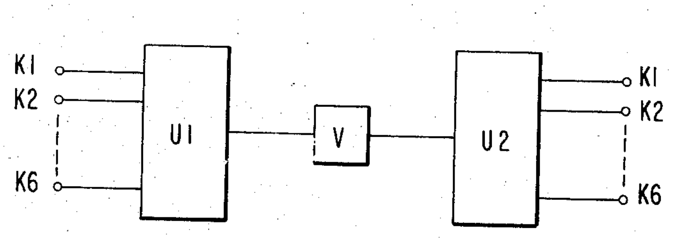
FIG. 1 is a general block schematic diagram of a common repeater amplifier unit.

The principle of a common amplifier unit will be apparent from FIG. 1. Six lines K1 to K6 are connected to a first converter U1, and by way of example it will be assumed that these six lines carry six low frequency speech bands, 0.3 to 3.4 kc. In the converter, these six signals are combined by frequency-division or time-division interlacing (multiplexing) of the low-frequency signals. The single multiplex signal is amplified in an amplifier stage V and split down in a second converter U2 which thus reconstitutes the six low frequency signals in amplified form. Depending upon the design of the amplifier stage and the converters, the arrangement can be non-directional or directional, for use in two-wire or four-wire circuits.

Figure 2:
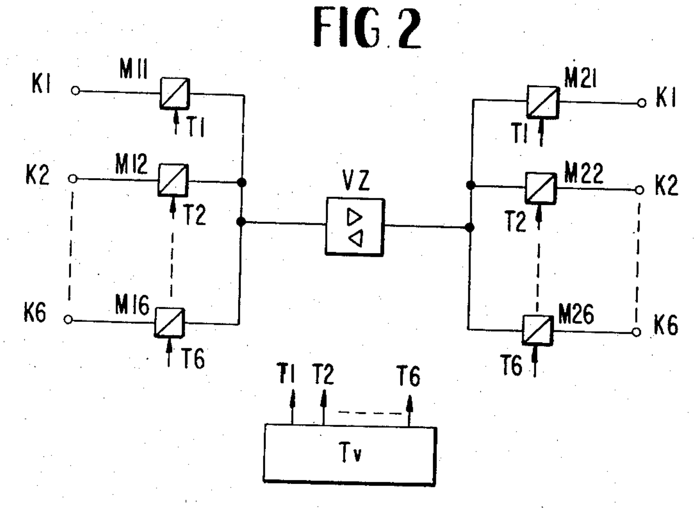
FIG. 2 is a block schematic diagram of a common amplifier unit employing frequency-division interlacing, for two-wire connections.

The basic construction of a common amplifier unit for two-wire circuits in which interlacing is effected in accordance with the frequency-division multiplex principle, is illustrated in the block-circuit diagram of FIG. 2. For interlacing and separating the signals in the converters each of the six lines K 1 to K 6 is provided with two frequency converters, M 11, M 21 to M 16, M 26, which have identical modulation properties in both directions of transmission. For example these modulators may conveniently employ double push-pull modulators employing diodes (e.g. ring-modulators), which produce two side bands and suppress the carrier. For the filtering out of the desired signal of 2 × 4 = 8 kc/s bandwidth, quite simple filters may be employed if a sufficiently large carrier interval is employed, say for example, 15 kc/s. A frequency converter of this sort has only very low overall attenuation, the figure being between about 2 and 3 dB.

Figure 3:
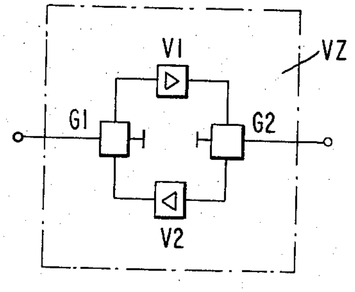
FIG. 3 is a block schematic diagram of a two-wire repeater with terminating sets, suitable for use as the amplifier stage in the embodiment illustrated in FIG. 2.
Figure 4:
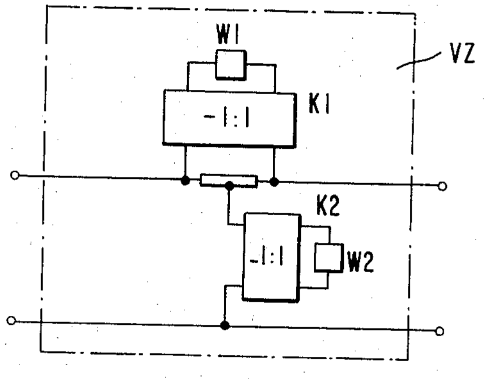
FIG. 4 is a schematic circuit diagram of a two-wire repeater with negative impedances, suitable for use as the amplifier stage in the embodiment illustrated in FIG. 2.

The amplifier stage VZ has identical properties of amplification in both directions of transmission, and two known arrangements are illustrated in FIGS. 3 and 4. In FIG. 3, the block schematic diagram of a two-wire amplifier stage illustrated consists of two terminating sets with dummies G 1 and G 2 and two uni-directional amplifiers V 1 and V 2 for the two directions of transmission. FIG. 4 illustrates a so-called NCT-amplifier (NCT standing for Negative Conduction with Transistors). The amplifier shown contains a bridged T-network with series and shunt negative impedances. Series impedance W 1 and shunt impedance W 2 represent dummies of the line which is to be de-attenuated, and impedance converters K 1 and K 2 having a transformation ratio −1:1 (e.g., grounded-base transistors with feedback) are provided for transforming these to negative impedances.

In order to reduce the demands made upon the linearity of the amplifier, the frequency schedule should be so selected that all the carrier frequency channels are contained within a band not exceeding one octave in width. As the frequency schedule of FIG. 6 shows, in this exemplary embodiment the double bands of the six channels are contained in the frequency band between 100 and 200 kc/s, at a carrier interval of 15kc/s.

As shown in FIG. 2, a carrier source Tv produces six carriers T 1 to T 6 for the modulators and in fact each two modulators (e.g. M 11 and M 21) allotted to the same channel, receive the same carrier (e.g. T 1). As already mentioned, the requirements in respect of the frequency accuracy of the carrier, are not stringent.

Figure 5:
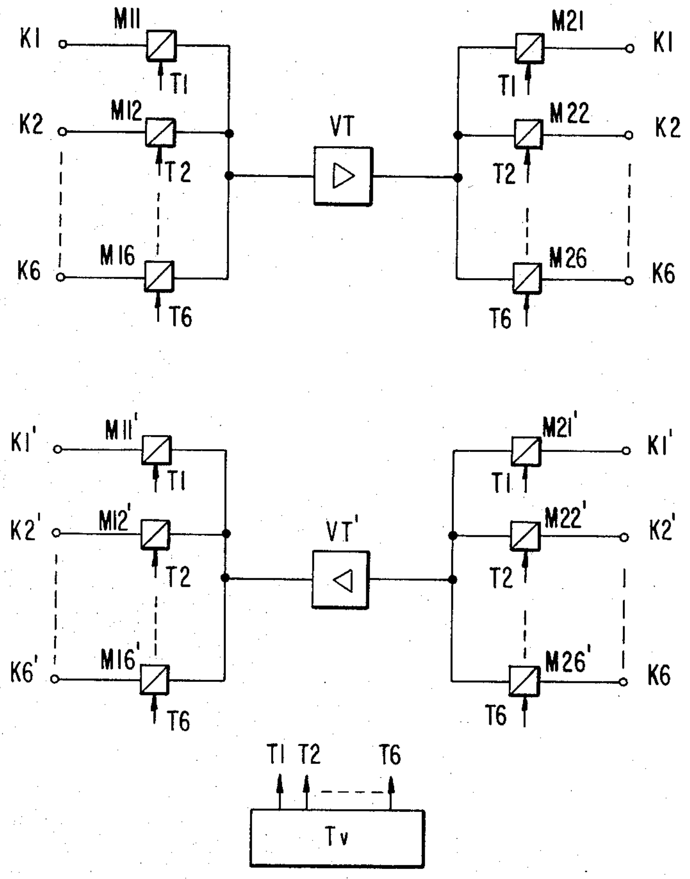
FIG. 5 is a block schematic diagram of a common amplifier unit employing frequency-division interlacing, for four-wire connections.

In the construction of a common amplifier unit employing frequency-division interlacing for use in four-wire circuits, similar criteria apply to those governing the construction of terminal equipments in carrier frequency four-wire systems. As shown in FIG. 5 the go-channel and return-channel of the amplifier stage both contain a simple uni-directional carrier frequency amplifier VT and VT'. A common carrier (e.g., T 1) is fed to the four modulators in each speech circuit (e.g., M 11, M 21, and M 11', M 21'). Here too, the modulators will conveniently be double push-pull circuits using diodes.

In the case of common amplifier units employing interlacing in accordance with the time-division multiplex principle, advantageously parametric amplifiers using the resonance transmission principle, may be employed. Amplifiers of this type for a single transmission channel have already been proposed, both for uni-directional and bi-directional operation. Their application as and modification for common amplifier units for use in two-wire and four-wire circuits is explained in the following, with reference to FIG. 7, which shows a basic circuit diagram of a common amplifier unit employing time-division interlacing operation for use in two-wire circuits. Low frequency lines K 1 to K 6 are terminated at input and output connections by low-pass filters F 11, F 21, to F 16, F 26, In the exemplary embodiment, these low-pass filters are in the form of identical networks which each terminate in a capacitor C 11, C 21, to C 16, C 26 serving as input or output store on either side of an amplifier stage VR. Between the tank capacitors and the amplifier stage VR, in the series arm of each low frequency line there are situated two scanning switches (e.g., S 11, S 21 in line K 1). With the aid of these electronic high speed switches, amplified energy is exchanged between each two stores allotted to one and the same line, via the common amplifier stage in both directions of transmission. The energy transfer takes place in chronological sequence in each line in a time which is short compared to the operating cycle time of the switches. The converters for the time interlacing of the signals thus consist of a low-pass filter and a scanning switch for each line.

The amplifier stage VR contains an element which is in a reciprocal relationship to the input and output storage reactances as far as frequency goes; in the embodiment concerned this element is in fact a coil Lp the inductance of which can be varied. This coil also serves as the oscillator coil in resonance transmission, and as the intermediate store. At opposite ends of the coils Lp in each case electronic switches S 1 and S 2 are arranged in the shunt arms. These two switches, by their sequence of operation, determine the direction in which energy transfer takes place and they will consequently be referred to in the following as the directional switches. They also decouple the input store from the output store to permit reflection-free transmission, which is necessary to ensure stability in two-wire operation.

The mode of operation of the common amplifier unit of FIG. 7 will be explained making reference to the sequence of operations depicted in FIG. 8. First of all, we will consider energy transfer through the low frequency line K 1 in the direction from the storage capacitor C 11 to the storage capacitor C 21, this transfer taking place during the time interval $t\,1 - t\,3$; above line *a*, this interval is indicated by $\overrightarrow{K\,1}$.

Shortly before the time $t\,1$, the scanning switches S 11, S 21 and the directional switches S 1, S 2, are opened and the signal source at the left (not shown) charges the storage capacitor C 11 up to a specific voltage U 1. At the time $t\,1$, the two scanning switches S 11 and S 21 close, as does the directional switch S 2 (FIG. 8, lines *a* and *e*). In the oscillatory circuit formed by C 11 and the coil Lp (of inductance Lp1), a current J commences to flow (FIG. 8, line *g*); the frequency of this current is given by $f\,1 = (1/2\pi\,\sqrt{C11 \cdot Lp1})$. At the time $t2$, that is after a quarter of a period of a sinusoidal oscillation J, this reaches a peak value and the energy has been transferred from the capacitor C 11 to the coil $Lp$ at this point; at this instant, the switch S 1 is closed, the switch S 2 opened and the inductance of the coil rapidly reduced from $Lp1$ to $Lp\,2$ (FIG. 8, lines *d, e, f*). The reduction in inductance leads to a sudden jump in the current J and in the energy stored in the coil $Lp$, this jump in the ratio $(Lp1/Lp2)$, that is to say parametric amplification takes place (FIG. 8, line *g*). The amplified signal energy now passes from the coil $Lp$ to the output store C 21; the frequency of the current rises to $f\,2 = (1/2\pi\,\sqrt{C21 \cdot Lp2})$, since C 21 = C 11, At the time $t3$, the current J has fallen to zero and the voltage U 2 across the output store C 21 has risen to its maximum during the scanning process just considered; this terminates the charge transfer process and the scanning switches S 11 and S 21, plus the directional switch S 1, open so that all the switches are again in this state (FIG. 8, lines *a,d,e*). The scanning time $t3 - t1$ must be so arranged that in each case it covers a quarter period of the sinusoidal oscillation of the current J, within the times $t2 - t1$ and $t3 - t2$, i.e., the condition $\tau = \pi/2\ \sqrt{C}\,(\sqrt{Lp1} + \sqrt{Lp2})$ is satisfied, where C = C 11 = C 21.

In chronological sequence, the energy transfer processes in the lines K 2 to K 6, in the direction from the left to the right, now follow one another in precisely the same manner as that taking place in the line K 1 (FIG. 8, time intervals $\overrightarrow{K\,2}$ to $\overrightarrow{K\,6}$).

The energy transfer in the reverse direction, from the right to the left, will also be considered, for the line K 1 (FIG. 8, time interval $\overleftarrow{K\,1}$). Shortly before the time $t1'$, we will consider the voltage U 2, stemming from the signal source at the left and appearing across the storage capacitor C 21, which voltage was transmitted during the scanning interval $t3 - t1$, to have dropped practically to zero. In the intervening period, this capacitor has been charged up to a specific voltage U 2' by the signal source at the right. At the time $t1'$, the scanning switches S 21, S 11 and the directional switch S 1 close. At the time $t2'$, S 1 is opened, S 2 is closed, and the inductance of the coil $Lp$ is quickly reduced. Thus, with reversal of the direction of transmission, the switching sequence and switching times of the two directional switches S 1 and S 2 are reversed, within the scanning period, this as lines *d* and *e* of FIG. 8 clearly show. Energy transfer itself takes place in the manner already discussed.

With two-way transmission, it should be borne in mind that, with energy transfer from left to right, for example, the energy stemming from the source at the right is dissipated during the time interval $t1 - t3$; with energy transfer in the reverse direction, the same thing happens. This means a power loss factor of two. The effective power gain thus corresponds to half the inductance ratio, i.e., to $(1/2) \cdot (Lp1/Lp2)$.

Compared with a conventional pulse-modulating system with separate pulse equipments at both ends of a multiplex line, a similar degree of simplification to that obtained with the frequency-division multiplex common amplifier unit is achieved, as common control pulse trains can be used for each two scanning switches, and an arbitrarily selectable scanning frequency. The scanning frequency, which must be at least twice the highest signal frequency, should be selected at such a level that no difficulties in respect of frequency response are encountered. For the time-division interlacing of six channels, in the manner of the exemplary embodiment, a convenient value for the scanning frequency is about 15 kcs. This means a pulse interval of $T_0 \approx 67\ \mu s$ per channel with transmission in one direction only; with alternate transmission in both directions, the pulse interval per channel is about 33 $\mu s$. In the common amplifier stage VR, the pulse interval for six channels is about 5.5 $\mu s$ corresponding to a pulse train frequency of 180 kcs. At a scanning periodicity of about 2 μs, which is within the range of simple electronic switches, there are sufficiently large gaps to prevent any cross-talk due to overshoot in the pulses. The cut-off frequency of the low-pass filters will conveniently be made just above half the scanning frequency.

The electronic switches are preferably of the type containing rectifiers, and are controlled, together with the variable inductors $Lp$, by switching pulses produced from a pulse souce Pv (FIG. 7). The rate and duration of these switching pulses, can be seen from FIG. 8. Conveniently, the pulse source Pv will contain a fundamental generator which, in the embodiment described, oscillates at the fundamental frequency $2\,nf_0 = 180$ kcs; where n is the number of channels ($n = 6$), and $f_0 = 1/T_0$, the scanning frequency in one direction of transmission ($f_0 = 15$ kcs). No particularly stringent requirements are placed upon the accuracy of the frequency of this generator. Through the medium of phase-shift elements for example, this fundamental generator controls three monostable multi-vibrators which produce the switching pulses P 1 and P 2 for the directional switches and the pump voltage P 3 for the variable inductor; in this context, the pulse trains P 1 and P 2 are exchanged with one another each half scanning cycle $T_0/2$. The switching frequency for the scanning switches (30 kcs) will preferably be obtained by frequency division (6 : 1 in this embodiment).

One alternative circuit arrangement to that illustrated in FIG. 7, employs low-pass filters in the form of identical T-networks terminated in a coil, in which case the scanning switches have break contacts placed in the shunt arms, which contacts are open during the scanning time. In the common amplifier stage, a variable capacitor is placed in the shunt arm to serve as intermediate store. The directional switches at both sides of the intermediate store are constituted by two break contacts in the series arm, these opening successively during the scanning time.

The principle of the parametric amplifier with associated resonance transmission, can also be applied to a common amplifier unit for four-wire circuits employing time-division interlacing, in which case two similar unidirectional amplifier stages Vr may be used.

The circuit arrangement illustrated in FIG. 7 can be used for both the go-channel and return-channel amplifiers, and the control program for the directional switches S 1 and S 2 is simplified since there is no longer any need to change the switching sequence. Here again, where the timing is concerned only one half of the diagram of FIG. 8 is appropriate and the time covered in this context is now a full scanning cycle $T_0$; the switching sequence of the scanning switches corresponds here to the scanning frequency, e.g., 15 kcs.

In the common amplifier unit illustrated in FIG. 9, employing time-division interlacing designed for use in four-wire circuits, simple uni-directional pulse amplifiers VP and VP′ are employed instead of parametric amplifiers. The mode of operation of this arrangement, as far as scanning is concerned, corresponds to that usually encountered in pulse modulation systems. The low-pass filters F 11, F 21, etc., are here terminated in ohmic resistors R 11, R 21 etc., and the pulse amplifier conveniently has a high input impedance and low output impedance. The four scanning switches of a speech circuit (e.g. S 11, S 21, S 11′, S 21′) are each fed with a common switch pulse train (e.g. P 10).

I claim:

1. A multiple message transmission system including in a single telephone exchange installation means for transmitting a multiplicity of telephone messages over distances of less than 10 km each over separate small diameter cable lines in their original time and frequency relationships, and for compensating for attenuation suffered by the messages in the cable lines, said single exchange installation including:

a common amplifier stage having two sets of terminals and operable to supply at one set of terminals amplified multiplexed messages supplied to its other set of terminals, first multiplex converter means having its input connected to a plurality of said small diameter lines and its output connected to said other set of terminals of said amplifier stage, second multiplex converter means having its input connected to said one set of terminals of said amplifier and its output connected to further extensions of said small diameter lines, said first and second converter means being operable respectively to multiplex together messages supplied thereto by said plurality of lines for common amplification in said amplifier stage, and to de-multiplex the plurality of messages, after amplification, to restore them to their original time and frequency relationships for further transmission over said further extensions of said lines, said lines being of the smallest possible diameter down to a lower limit of 0.2 mm.

2. A system according to claim 1, wherein said lines are formed by pairs of copper conductors, each having a diameter of less than 0.4 mm.

3. A system according to claim 1, wherein said separate lines are subscribers lines.

4. The apparatus of claim 1, wherein said first converter means combine said separate signals to form a frequency-division multiplex signal which is reconstituted into separate signals by said second converter means, and a common carrier source feeds both said first and said second converter means each with a plurality of different carrier frequencies.

5. The apparatus of claim 4, wherein said input and output connections two-wire adapted for use with two-wire circuits, said amplifier stage has identical amplification properties in both directions of transmission, and each converter means employs a frequency converter having identical modulation properties in both directions of transmission.

6. The apparatus of claim 5, wherein said amplifier stage is a twowire repeater with terminating sets.

7. The apparatus of claim 4, wherein the carrier intervals and carrier frequencies of said common carrier source are such that said multiplex signal frequency band is contained within one octave.

* * * * *